(12) United States Patent
Zavesky et al.

(10) Patent No.: US 11,341,540 B2
(45) Date of Patent: May 24, 2022

(54) METHODS, SYSTEMS AND DEVICES FOR SELECTING ADVERTISEMENTS BASED ON MEDIA PROFILES AND ADVERTISEMENT PROFILES

(71) Applicant: AT&T Intellectual Property I, L.P., Atlanta, GA (US)

(72) Inventors: Eric Zavesky, Austin, TX (US); Behzad Shahraray, Holmdel, NJ (US); Bernard S. Renger, New Providence, NJ (US); Raghuraman Gopalan, Dublin, CA (US); Tan Xu, Bridgewater, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 356 days.

(21) Appl. No.: 15/941,296

(22) Filed: Mar. 30, 2018

(65) Prior Publication Data

US 2019/0303974 A1 Oct. 3, 2019

(51) Int. Cl.
*G06Q 30/00* (2012.01)
*G06Q 30/02* (2012.01)

(52) U.S. Cl.
CPC ..... *G06Q 30/0269* (2013.01); *G06Q 30/0242* (2013.01); *G06Q 30/0275* (2013.01)

(58) Field of Classification Search
CPC .................................. G06Q 30/0269
See application file for complete search history.

(56) References Cited

U.S. PATENT DOCUMENTS 8,549,556 B2   10/2013   Rakib et al.
8,649,613 B1   2/2014    Leung et al.
(Continued)

FOREIGN PATENT DOCUMENTS

WO   2017095942   6/2017
WO   2017218712   12/2017

OTHER PUBLICATIONS

Ma et al., IDTV broadcast applications for handheld device, 2004, IEEE Communications Society, pp. 83-89 (Year: 2004).*

(Continued)

*Primary Examiner* — Naresh Vig
(74) *Attorney, Agent, or Firm* — Guntin & Gust, PLC; Atanu Das

(57) ABSTRACT

Aspects of the subject disclosure may include, for example, embodiments for determining a media profile for media content. The media profile comprises a media metric for each of a plurality of portions of the media content. Further, embodiments include determining a price for advertising associated with the media content. In addition, embodiments include identifying an advertisement profile for each of a plurality of advertisements. The advertisement profile comprises an ad metric for each of a plurality of portions of an advertisement. Also, embodiments include selecting a first advertisement associated with a first advertisement profile from the plurality of advertisements according to the media profile, the first advertisement profile, and the price for the advertising associated with the media content. Further, embodiments include providing the first advertisement to be presented with the media content at a playback device. Other embodiments are disclosed.

20 Claims, 8 Drawing Sheets

(56) References Cited

U.S. PATENT DOCUMENTS

| | | |
|---|---|---|
| 8,718,682 B2 | 5/2014 | Brownworth et al. |
| 9,047,516 B2 | 6/2015 | Archer |
| 9,159,328 B1 | 10/2015 | Goesnar |
| 9,298,919 B1 | 3/2016 | Ranadive et al. |
| 9,465,995 B2 | 10/2016 | Cremer et al. |
| 9,684,907 B2 | 6/2017 | Bernosky et al. |
| 9,712,587 B1 | 7/2017 | Stevens et al. |
| 9,740,775 B2 | 8/2017 | Wang et al. |
| 9,760,910 B1 | 9/2017 | Tuchman et al. |
| 2006/0245625 A1 | 11/2006 | Tichelaar et al. |
| 2006/0271947 A1 | 11/2006 | Lienhart et al. |
| 2008/0319844 A1 | 12/2008 | Hua et al. |
| 2010/0312653 A1 | 12/2010 | Carpenter et al. |
| 2011/0022633 A1 | 1/2011 | Bernosky et al. |
| 2016/0012475 A1 | 1/2016 | Liu |
| 2016/0210660 A1 | 7/2016 | Flynn |
| 2016/0267180 A1 | 9/2016 | Harron et al. |
| 2016/0381432 A1 | 12/2016 | Cho et al. |
| 2017/0019719 A1 | 1/2017 | Neumeier et al. |
| 2017/0061504 A1 | 3/2017 | Phillips |
| 2017/0244999 A1 | 8/2017 | Chen |
| 2017/0272814 A1 | 9/2017 | Chen |
| 2018/0084310 A1* | 3/2018 | Katz ................ G06Q 30/0242 |
| 2019/0026790 A1* | 1/2019 | Bayer ............... H04N 21/4331 |
| 2019/0268634 A1* | 8/2019 | Ramakrishnan ... H04N 21/4854 |
| 2020/0043056 A1* | 2/2020 | Marsh .............. G06F 16/24578 |

OTHER PUBLICATIONS

"Video Fingerprinting SDK .Net / C++", visio forge, visioforge.com, v 10.0, Jan. 22, 2014.

Liu, Yandong et al., "Finding the right consumer: optimizing for conversion in display advertising campaigns", Proceedings of the fifth ACM international conference on Web search and data mining. ACM, 2012.

Perlich, Claudia et al., "Machine learning for targeted display advertising: Transfer learning in action", Machine learning 95.1, 2014, 103-127.

Tanner, Adam, "How Ads Follow You from Phone to Desktop to Tablet", MIT Technology Review, technologyreview.com, Jul. 1, 2015.

Xiao, Mengbai et al., "OpTile: Toward Optimal Tiling in 360-degree Video Streaming", Session: Fast Forward 3; MM'17, Oct. 23-27, Mountain View, CA, USA, 2017.

* cited by examiner

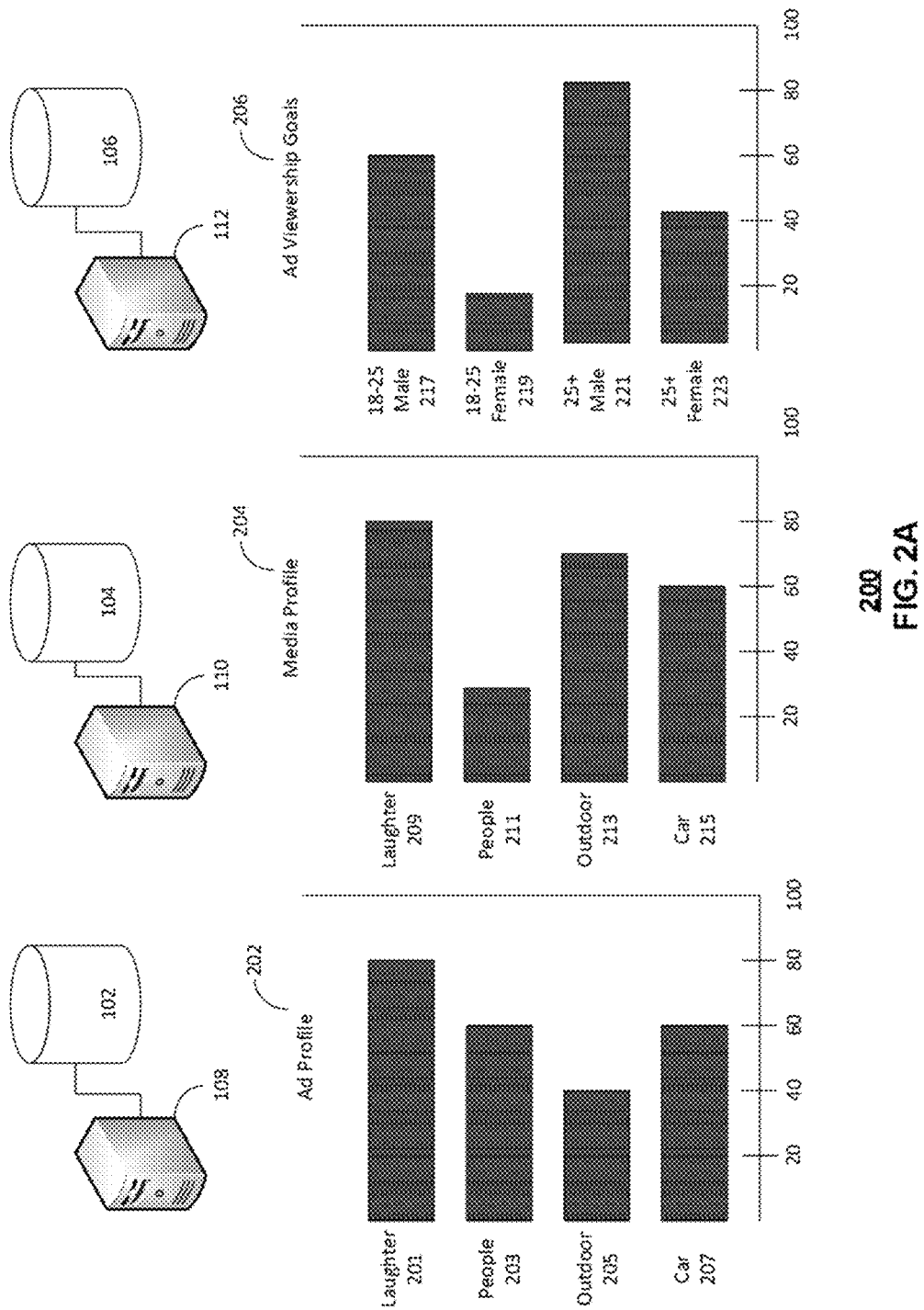

500

METHODS, SYSTEMS AND DEVICES FOR SELECTING ADVERTISEMENTS BASED ON MEDIA PROFILES AND ADVERTISEMENT PROFILES

FIELD OF THE DISCLOSURE

The subject disclosure relates to a selecting advertisements based on media profiles and advertisement profiles.

BACKGROUND

Advertisements for media content have been selected based on advertisers purchasing advertising space associated with the media content. Advertisers traditionally purchase advertising space based on popularity of the media content or the demographics of the viewers for the media content or related media content (e.g. past episodes of the media content).

BRIEF DESCRIPTION OF THE DRAWINGS

Reference will now be made to the accompanying drawings, which are not necessarily drawn to scale, and wherein:

FIGS. 2A-2B depicts illustrative embodiments of a system for selecting advertisement based on media profiles and advertisement profiles;

DETAILED DESCRIPTION

Figure 1:
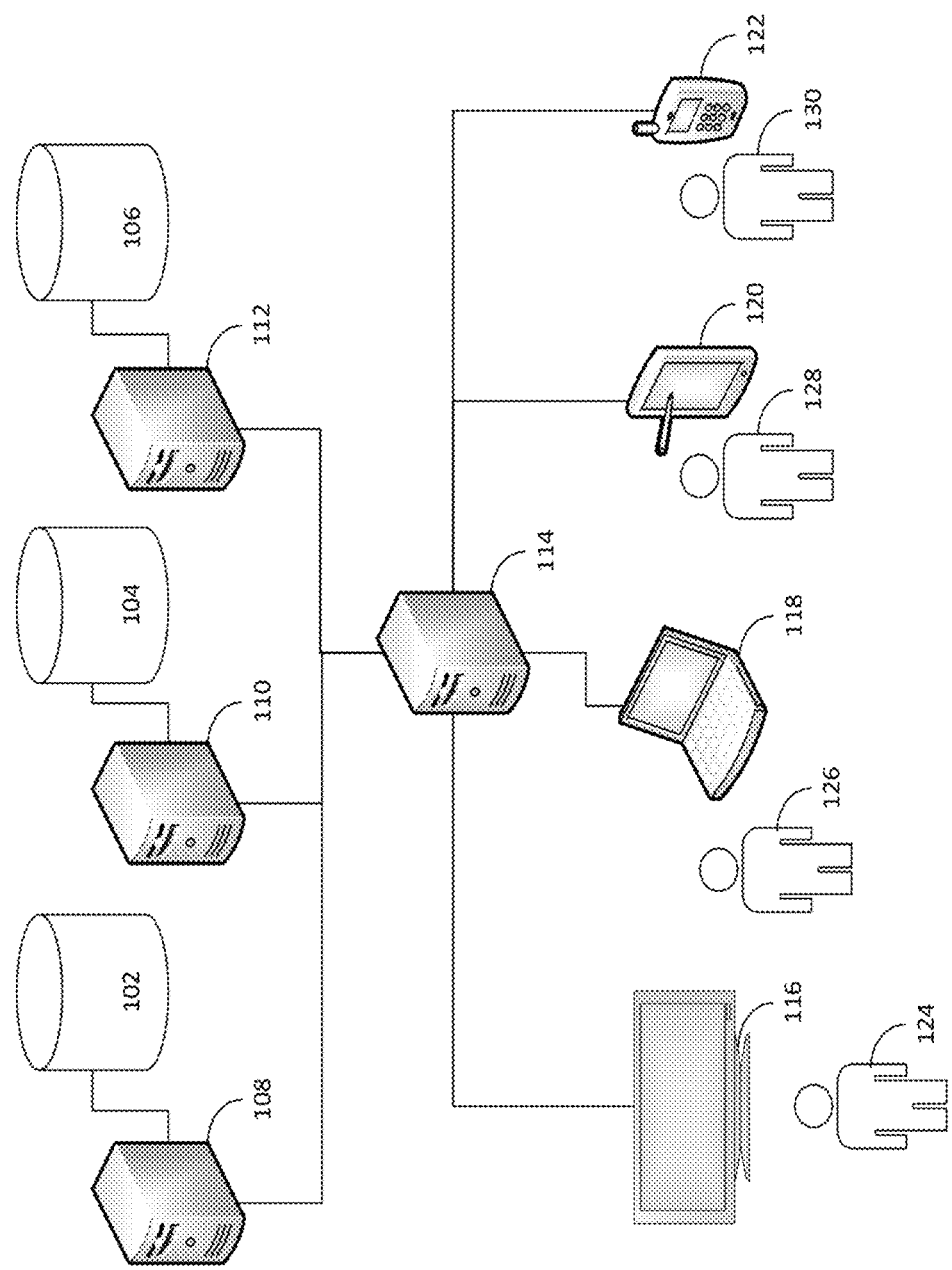
FIG. 1 depicts an illustrative embodiment of a system for selecting advertisement based on media profiles and advertisement profiles.

The subject disclosure describes, among other things, illustrative embodiments for determining a media profile for media content. The media profile comprises a media metric for each of a plurality of portions of the media content. Further, embodiments include determining a price for advertising associated with the media content. In addition, embodiments include identifying an advertisement profile for each of a plurality of advertisements. The advertisement profile comprises an ad metric for each of a plurality of portions of an advertisement. Also, embodiments include selecting a first advertisement associated with a first advertisement profile from the plurality of advertisements according to the media profile, the first advertisement profile, and the price for the advertising associated with the media content. Further, embodiments include providing the first advertisement to be presented with the media content at a playback device. Other embodiments are described in the subject disclosure.

One or more aspects of the subject disclosure include a device. The device comprises a processing system including a processor and a memory that stores executable instructions that, when executed by the processing system, facilitate performance of operations. Operations can include determining a media profile for media content. The media profile comprises a media metric for each of a plurality of portions of the media content resulting in a plurality of media metrics. Further operations include determining a price for advertising associated with the media content. Additional can operations include identifying an advertisement profile for each of a plurality of advertisements resulting in a plurality of advertisement profiles. The advertisement profile comprises an ad metric for each of a plurality of portions of an advertisement resulting in a plurality of ad metrics. Also, operations can include selecting a first advertisement associated with a first advertisement profile from the plurality of advertisements according to the media profile, the first advertisement profile, and the price for the advertising associated with the media content. Further operations can include providing the first advertisement to be presented with the media content at a playback device.

One or more aspects of the subject disclosure include a non-transitory, machine-readable medium, comprising executable instructions that, when executed by a processing system including a processor, facilitate performance of operations. Operations can include determining a media profile for media content. The media profile comprises a media metric for each of a plurality of portions of the media content resulting in a plurality of media metrics. Further operations can include determining a price for advertising associated with the media content. Additional operations can include identifying an advertisement profile for each of a plurality of advertisements resulting in a plurality of advertisement profiles. The advertisement profile comprises an ad metric for each of a plurality of portions of an advertisement resulting in a plurality of ad metrics. Also, operations can include detecting a type of playback device for the advertising associated with the media content. Further operations can include selecting a first advertisement associated with a first advertisement profile from the plurality of advertisements according to the media profile, the first advertisement profile, the price for the advertising associated with the media content, and the type of playback device. Further operations can include providing the first advertisement to be presented with the media content at the playback device.

One or more aspects of the subject disclosure include a method. The method can include determining, by a processing system including a processor a media profile for media content. The media profile comprises a media metric for each of a plurality of portions of the media content resulting in a plurality of media metrics. Further, the method can include determining, by the processing system, a price for advertising associated with the media content. In addition, the method can include identifying, by the processing system, an advertisement profile for each of a plurality of advertisements resulting in a plurality of advertisement profiles. The advertisement profile comprises an ad metric for each of a plurality of portions of an advertisement resulting in a plurality of ad metrics. Also, the method can include determining, by the processing system, a type of playback medium for the media content. Further, the method can include selecting, by the processing system, a first advertisement associated with a first advertisement profile from the plurality of advertisements according to the media profile, the first advertisement profile, the price for the advertising associated with the media content, and the type of playback medium. In addition, the method can include providing, by the processing system, the first advertisement to be presented with the media content at a playback device.

FIG. 1 depicts an illustrative embodiment of a system 100 for selecting advertisement based on media profiles and advertisement profiles. In one or more embodiments, the system 100 includes an advertisement database 102 associated with an advertisement server 108. The advertisement database 102 can include an advertisement profile for each advertisement stored therein. The advertisement profile can include one or more advertisement metrics. The advertisement metrics can include the advertisement viewership goals. Further, the system 100 includes a media content database 104 associated with a media content server 110. The media content database 104 can include a media profile for each portion of media content stored therein. The media profile can include one or more media metrics In addition, the system 100 includes a viewership metrics database 106 associated with a viewership metrics server 112. The viewership metrics can be for the viewership for the media content stored in the media content database 104 or the viewership metrics for different types of playback medium, playback devices, or types of media content. In addition, the viewership metrics can include the historical viewership of media content, portions of media content, or related media content. Also, the viewership metrics can include the historical viewership of previous advertisements associated with media content, portions of media content, or related media content. Further, the viewership metrics can include the level of interaction by viewers with such previous advertisements. For example, if a previous advertisement included a link to a website, the viewership metric can include a number of people who accessed the link and viewed the website.

Also, the system 100 includes an advertisement management server (e.g. ad management server) 114. The system 100 can include users 124-130, each of which associated with a playback device 116-122. The playback devices 116-122 can present any type of media content including, but limited to, on-demand content, broadcast content, streaming content, content provided from a digital video recorder, stored content, etc. The playback devices 116-122 can include a mobile device such as a laptop computer, tablet computer, smartphone or mobile phone, wearable device such as a smart watch, media device such as a television, set top box, media processor, or computer, or any other computing device that can display media content and/or advertisements associated, overlaid, presented with, or embedded within the media content. Further, playback devices 116-122 can be called user devices or devices associated with users 124-130. Further, each user 124-130 can view the media content or advertisement in different ways such as through broadcast cable or satellite programming, streaming media content, downloaded media content, viewed from stored media content from a digital video recorder (DVR), etc. These different ways to view the media content or advertisement can be called the playback medium. The ad management server 114 can provide advertisements within media content or associated with media content to any of the playback devices 116-122 based on one or more media content profiles, one or more advertisement content profiles, media content metrics, advertisement metrics, viewership metrics, type of playback device, or type of playback medium. In some embodiments, one or more of the servers 108-114 can be integrated into one another.

In one or more embodiments, the ad management server 114 can determine the media profile for media content. The media content and the media profile can be provided to the ad management server 114 by the media content server 110 accessed from the media content database 104. The media content can be provided to any of the playback devices 116-122 by the ad management server 114. In some embodiments the media profile can comprise a media metric for a portion of the media content. For example, a scene in a movie media content can be fun party in a courtyard of a luxury hotel in New York City. The media metrics for the scene can include laughter, people, outdoor, urban, and luxury. Each metric can be scored on a scale (e.g. 1-100) based on different criteria. For example, one criterion can be the percentage of time in the scene includes laughter, people, an outdoor environment, urban environment, or luxury items. In other embodiments, the ad management server 114 can analyze the media content using image recognition, voice recognition, or text recognition techniques to determine the media profile and the media metrics associated with the media content.

In one or more embodiments, the ad management server 114 can detect objects within the media content (using image recognition, voice recognition, text recognition, etc.) associated with advertisements stored in the advertisement database 102 such as a beverage, type of car, etc. In further embodiments, the ad management server 114 can determine a correlation between the detected object and the subject matter of the media content. For example, ad management server 114 can detect a fast car in a movie such as Fast and the Furious. Further, the ad management server 114 can correlate that the detected object (e.g. fast car) is related to the subject matter of the media content (e.g. Fast and Furious) to then obtain ads from the advertisement database 102 via the advertisement server 110 relating to fast cars similar to those found in the media content.

In one or more embodiments, the ad management server 114 can determine the price for advertising associated with the media content. In some embodiments, the ad management server 114 can set a price based on the viewership metrics obtained from the viewership metrics database 106 and the viewership metrics server 112. That is, the more viewership for the media content or previous advertisements associated with the media content indicated by the viewership metrics, the higher the price can be set by the ad management server 114 for current advertising. In other embodiments, the ad management server 114 can determine the price for advertising by notifying multiple advertisers that it is requesting a bid for the advertising. In some embodiments, the notification of multiple advertisers can be based on bidding history. For example, the notification of the multiple advertisers can be the higher previous bidders (above a predetermined bid threshold) correlated to a particular detected object or particular subject matter of the media content. The multiple advertisers can obtain the viewership metrics (e.g. historical viewership, demographic viewership, etc.) for the media content or previous advertisements associated with the media content. Further, the ad management server 114 can receive a bid from each of the multiple advertisers. In addition, the ad management server 114 can select an advertisement from an advertiser based on the highest bid received from the multiple advertisers. In some embodiments, the advertisement is selected during the presentation of the media content and displayed in at the next advertisement placement (e.g. scene change) or presented proximate to the presentation of the media content. In other embodiments, if there is no bid received or no bid that satisfies a predetermined threshold or criteria, a default advertisement can be presented.

In one or more embodiments, the ad management server 114 can identify an advertisement profile for each of a multiple advertisements accessed by the advertisement database 102 and provided by the advertisement server 108. The advertisement profile can comprise one or more ad metrics. In some embodiments, the ad management server 114 can select an advertisement from the advertisement database 102 according to the media profile, advertisement profile associated with the advertisement, (or portions thereof) and the price for the advertising associated with the media content. In further embodiments, the advertisement can be presented with the media content at one of the playback devices 116-122. In some embodiments, the advertisement can be delivered via unicast to a set top box communicatively coupled to a playback device or to the playback device. In additional embodiments, the advertisement can be multicast to a several different playback devices or a set top box. In further embodiments, the ad management server 114 can provide the advertisement to the media content server. In some embodiments, the set top box, ad management server 114 or media content server 110 can insert the advertisement into the media content. In other embodiments, the advertisement can be embedded within the media content, be presented proximate to, or overlaid on top of the media content. In additional embodiments, multiple advertisements can be obtained by the ad management server 114, media content server 110 or set top box and bidding results can determine which ad is provided with the media content. In further embodiments, the media content can be unicast, broadcast, multicast, with or without the advertisement (if without the advertisement, then the advertisement can be inserted y the ad management server 114, set top box of playback device 116-122).

In one or more embodiments, the ad management server 114 can analyze the media content using image recognition techniques, voice recognition techniques, or text recognition techniques to identify an item in the media content. The item can be a good or service offered by an advertiser. In some embodiments, the ad management server 114 can select the advertisement for the media content based on the advertisement having a correlation to the item. That is, the ad management server 114 can select an advertisement for the media content for the item itself, a complementary item, or for a competing item. For example, if the media content includes an item associated with a fast food chain restaurant, then an advertisement for the fast food chain restaurant can be selected. In another example, an advertisement for a soda company can be selected because soda can be a complementary item to fast food. In a further example, an advertisement for a competing fast food chain restaurant can be selected. A competing fast food chain restaurant may pay a higher price for advertising associated with the media content to diminish the market for its competitor with the media content viewing audience.

In one or more embodiments, the ad management server 114 can detect the type of playback device presenting the advertising and can select the advertisement to be associated with the media content according to the type of playback device. For example, if the ad management server 114 detects that playback device 122, which is a smartphone, is receiving and presenting the advertisement, the ad management server 114 can select an advertisement that can be viewed easily on a display of the smartphone rather than another advertisement that may be better viewed on a larger display of a television playback device 116 (e.g. less resolution vs. more resolution).

In one or more embodiments, the ad management server 114 can detect the type of playback medium in which the advertisement is presented and can select the advertisement to be associated with the media content according to the type of playback medium. For example, if the ad management server 114 detects that playback medium is streaming media content, then the ad management server 114 can select an advertisement that can be embedded within the streaming media content. As another example, if the ad management server 114 detect that the playback medium is broadcasting the media content on a television playback device 116, then the ad management server 114 can select an advertisement that can be overlaid on or presented proximate to (e.g. as a banner) the broadcast of the media content.

In one or more embodiments, the ad management server 114 can access viewership metrics from the viewership metrics database 106 provided by the viewership metrics server 112. The viewership metrics can indicate the viewership of previous presentations of the media content or related media content (e.g. past episodes) as well as previous advertisements associated with the previous presentations of the media content or the related media content. Viewership metrics can include an amount of people viewing media content or advertisements as well as demographic information of portions of the viewership. The viewership metrics can also include the historical viewership of the previous presentations of the media content and related content as well as the historical viewership of previous advertisements for the previous presentations of the media content or related media content as well as a level of interaction between viewers and previous advertisements. The ad management server 114 can select the advertisement for the media content according to the any one of the viewership metrics including historical viewership of previous presentations of media content, previous advertisements associated with the media content, or level of interaction with previous advertisements. Thus, the ad management server 114 can select the advertisement when a viewership metric satisfies a predetermined threshold (e.g. below a threshold, above a threshold, within a range, etc.).

In one or more embodiments, the ad management server 114 can determine the level of interaction of previous advertisements associated with media content. That is, the previous advertisements have an interaction capability such as being selected by a remote control device when the previous advertisement is presented on a television playback device 116 or being selected by a user input device when the previous advertisement is presented on a laptop, tablet, or smartphone playback device 118-122. If a number of the people interacting with one or more previous advertisements satisfies a predetermined threshold (e.g. below a threshold, above a threshold, etc.), then the ad management server 114 can select the same advertisement or an advertisement with a similar advertisement profile/ad metrics.

In one or more embodiments, the viewership metrics stored in the viewership metrics database 106 provided by the viewership metrics server 112 or the ad metrics stored in the advertisement database 102 provided by the advertisement server 108 can also include the viewership goals for either the media content or for one or more advertisements. The ad management server 114 can select an advertisement according to the viewership goal of the advertisement and the viewership goal of the media content. For example, if the viewership goal of the media content is to reach an audience of 1 million viewers between age of 21-35 and the viewership goal of ad advertisement is to also reach an audience of 1 million viewers between age of 21-35, then the ad management server 114 can select the advertisement to be associated with the media content. In some embodiments, the viewership goal of the advertisement can be larger than the viewership goal of one particular media content. In such embodiments, the advertisement may be presented in association with two or more media content to achieve the advertisement viewership goal (the total viewership goal of the two or more media content is equal to or more than the viewership goal of the advertisement).

In one or more embodiments, the ad management server 114 can implement a machine learning algorithm to select advertisements according to various parameters described herein including, but not limited to, a media profile, media metrics, advertisement profile, ad metrics, price, bids, type of playback device, type of playback medium, viewership metrics, and level of previous ad interaction. In some embodiments, the machine learning algorithm is trained on a training data. Thereafter, the machine learning algorithm selects advertisements according to the parameters and the training data. Further, the machine learning algorithm updates its selection criteria based on the level of interaction or viewing of the selected advertisements. For example, if one selected advertisement for media content has a high level of interaction, then the ad management server 114 can select another advertisement for a future presentation of the media content with a similar advertisement profile. The machine learning algorithm is updated to indicate that the advertisement profile associated with the high level of interaction. However, if one selected advertisement for media content has a low level of interaction, then the ad management server 114 can select another advertisement for a future presentation of the media content with a different advertisement profile. The machine learning algorithm is updated to indicate that the advertisement profile associated with the low level of interaction. As another example, if one selected advertisement for media content has a high level of viewership, then the ad management server 114 can select another advertisement for a future presentation of the media content with a similar advertisement profile. The machine learning algorithm is updated to indicate that the advertisement profile associated with the high level of viewership. However, if one selected advertisement for media content has a low level of viewership, then the ad management server 114 can select another advertisement for a future presentation of the media content with a different advertisement profile. The machine learning algorithm is updated to indicate that the advertisement profile associated with the low level of viewership. In some embodiments, machine learning incorporates what is considered "good" advertisement selection that can include taking into account implicit feedback, explicit feedback, and collaborative filtering. Implicit feedback can include taking into account advertiser's bidding history and past selection of media content to be associated with an advertisement. Explicit feedback can include post advertisement survey results from advertisers of the effect of the advertisement (clicks of the advertisement, purchase of product or service after advertisement is presented, increasing market share, company profit increase, market reputation, or any other related changes after advertisement is presented, etc.) Collaborative filtering can include taking into account competitor's or same industry company's choice of media content for their advertisements.

In one or more embodiments, the ad management server 114 can access the metadata of the media content from the media content database 104 provided by the media content server 110. The ad management server 114 can analyze the metadata to determine its own media profile and select advertisement according to the media profile. In some embodiments, the ad management server 114 can obtain the advertisement profile of an advertisement from the advertisement database 102 and provided by the advertisement server 108. In such embodiments, the ad management server can select the advertisement based on the media profile and the advertisement profile being similar or complementary.

In one or more embodiments, the ad management server 114 can analyze the media content using image recognition techniques to recognize visual content as well as voice recognition techniques to recognize audio content. Thus, by recognizing the visual content and the audio content, the ad management server 114 can generate a media profile accordingly. Further, the ad management server 114 can select an advertisement accordingly to the media profile or according to whether the media content is similar or complementary to an advertisement profile associated with the advertisement.

In one or more embodiments, the ad management server 114 analyzes the media content to determine a structure of the media content. Further, the ad management server 114 can place an advertisement within the media content according to the structure of the media content. In some embodiments, determining the structure of the media content can include determining an end of a fast-paced scene (e.g. car chase) and a beginning of a slow-paced scene (e.g. a dialogue-filled walk in the park). The ad management server 114 can place an advertisement between such a fast-paced scene and the slow-paced scene.

In one or more embodiments, the ad management server 114 can receive a request from an advertiser to place an advertisement in a particular space associated with the presentation of the media content or within a particular time within the media content. In some embodiments, the advertiser may request place an advertisement on a display during the presentation of the media content below, above, overlaid on top of, or proximate to the presentation of the media content. In other embodiments, the advertiser may request to place the advertisement within a certain time period, or after certain visual content or audio content, within the media content. In further embodiments, the ad management server 114 can place the advertisement according to the request from the advertiser. In additional embodiments, the ad management server 114 can determine the price for the advertisement according to the placement of the advertisement.

Figure 2B:
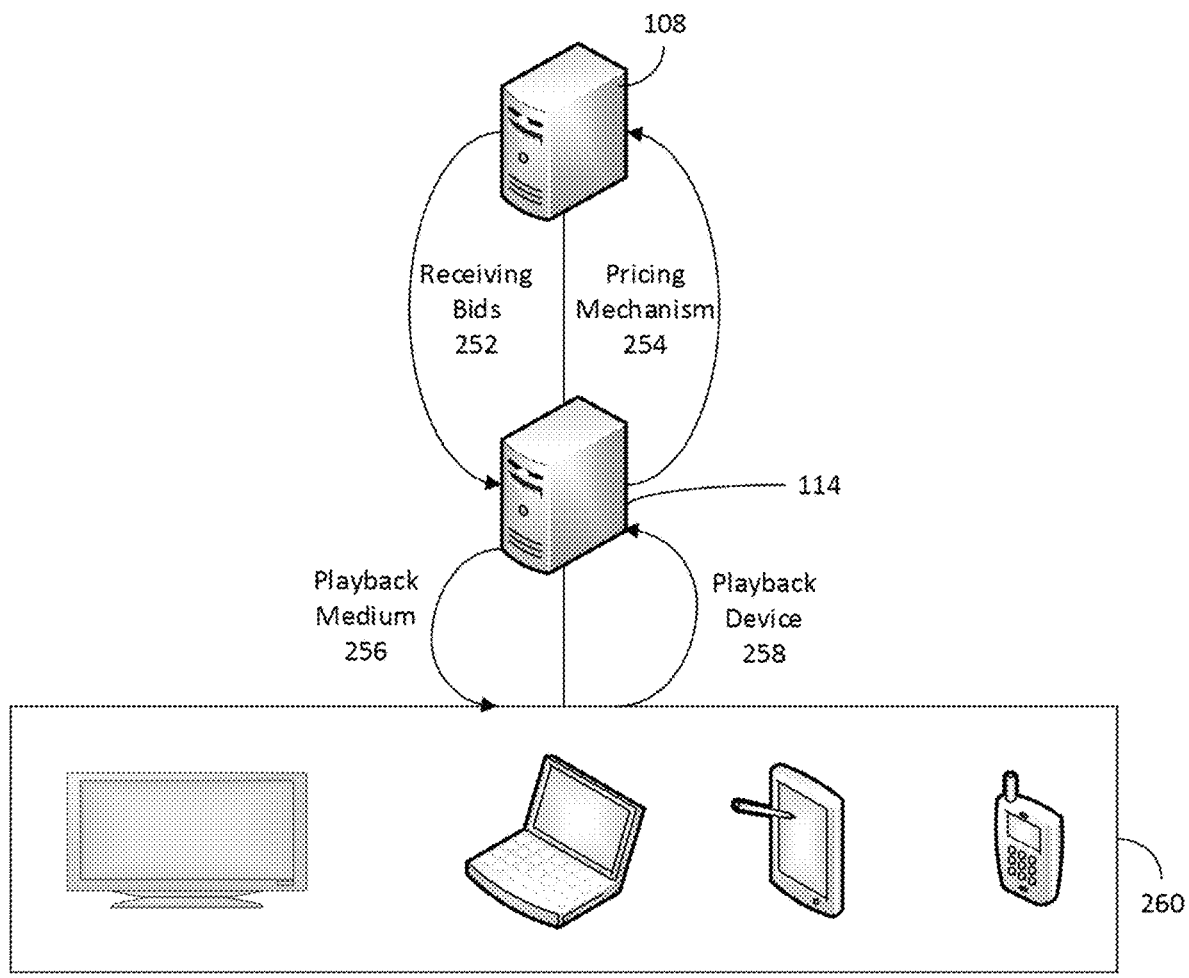

FIGS. 2A-2B depicts illustrative embodiments of a system for selecting advertisement based on media profiles and advertisement profiles. Referring to FIG. 2A, in one or more embodiment, an ad profile 202 for an advertisement can be obtained by an ad management server 114 from an advertisement database 102 via an advertisement server 108. The ad profile 202 can include several ad metrics such as the amount of laughter 201 and people 203 in the advertisement. Further, an ad metric can be whether the advertisement is in an outdoor 205 environment. In addition, another ad metric can be whether the advertisement contains a car 207.

In one or more embodiments, a media profile 204 for a particular media content can be obtained by an ad management server 114 from a media content database 104 via a media content server 110. The media profile 204 can include several media metrics that can be the same metrics as the ad metrics such as the amount of laughter 209 and people 211 in the advertisement. Further, a media metric can be whether the advertisement is in an outdoor 213 environment. In addition, another media metric can be whether the advertisement contains a car 215. In other embodiments, the media metrics can include similar or complementary metrics to the ad metrics.

In one or more embodiments, the ad metrics 201-207 and the media metrics 209-215 can be scored on a scale of 0-100. The score for each metric can be based on different criteria such as the percentage of time piece of content is within an advertisement or media content. For example, a 30 second advertisement may be particularly funny such that there is laughter 80% of the time. Continuing with the example, the media content can be a two minute scene in which laughter is present for 80% of the time.

In one or more embodiments, the ad management server 114 can select the advertisement according to the ad profile 202 and/or the media profile 204. For example, if three of the four metrics are within 20 points of each other, the ad management server 114 may select the advertisement associated with the ad profile 202 to be presented with the media content associated with the media profile 204.

In one or more embodiments, the ad management server 114 can obtain ad viewership goals from the viewership metrics database 106 via the viewership metrics server 112. The ad viewership goals can include viewership metrics for certain demographics such as males 18-25 years of age 217, females 18-25 years of age 219, males over 25 years of age 221, and females over 25 years of age 223. Viewership metrics can be scored from a scale of 0-100 based on criteria. For example, the score can be the percentage of the demographic in a particular market.

In one or more embodiments, the ad management server 114 can select an advertisement to be presented with a particular media content according to the ad viewership goals 206 and/or historical viewership of the previous presentations media content, related media content (e.g. past episodes), or previous advertisements. For example, if a previous presentation of the media content had historical viewership that was within 20 points of the viewership goal for three out of four viewership metrics of the ad viewership goals, then the ad management server 114 may select the advertisement associated with the ad viewership goals 206 to be presented with the media content.

Referring to FIG. 2B, in one or more embodiments, the ad management server 114 can implement a pricing mechanism 254 that may include requesting bids from multiple advertisers for placing an advertisement for particular media content. Such request for bids can be sent to an advertisement server 108. In further embodiments, the ad management server 114 receives a bid 252 from some or all of the advertisers for placing an advertisement with the media content. The ad management server 114 can select an advertisement associated with the highest bid.

In one or more embodiments, the ad management server 114 detects a type of playback device 258 for each of multiple playback devices 260. In some embodiments, the ad management server selects an advertisement according to the type of playback device. For example, an advertisement with visual effects may be better to be presented on a playback device with a bigger display such as a television. In another example, advertisement with a large amount of dialogue is better to be presented on a playback device with a smaller display such as a smartphone. The ad management server 114 can select the highest bid among a subset of bids for a type of advertisement that may be best suited for a particular playback device. For example, the ad management server 114 may select the advertisement with the highest bid among advertisements with visual effects to be presented on a television with a particular media content. Continuing with the example, the ad management server 114 may select advertisement with the highest bid among advertisements with a large amount of dialogue to be presented on a smartphone with the same particular media content.

In one or more embodiments, the ad management server 114 detects a type of playback medium 256 for each of multiple playback devices 260. In some embodiments, the ad management server selects an advertisement according to the type of playback medium. For example, a banner advertisement that can be overlaid on or presented proximate to media content may be better to be presented on a broadcast playback medium. In another example, scene advertisement (an ad that acts out a scene) is better to be embedded in a streaming playback medium. The ad management server 114 can select the highest bid among a subset of bids for a type of advertisement that may be best suited for a particular playback medium. For example, the ad management server 114 may select the advertisement with the highest bid among banner advertisements to be presented with a particular media content in a broadcast playback medium. Continuing with the example, the ad management server 114 may select advertisement with the highest bid among scene advertisements to be embedded in the same particular media content in a streaming playback medium.

Figure 3:
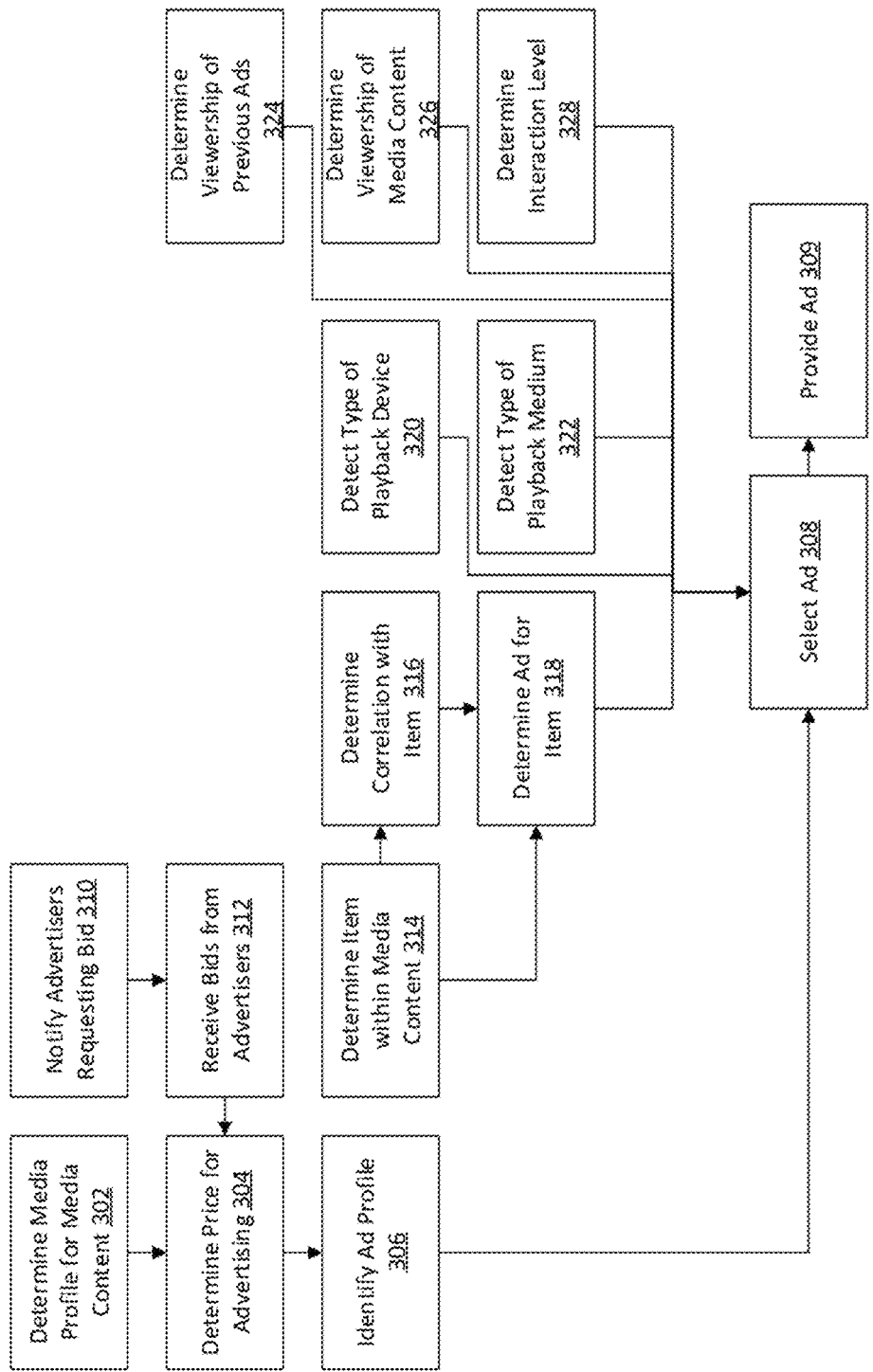
FIG. 3 depicts an illustrative embodiment of a method used in portions of the system described in FIGS. 1 and 2A-2B.

FIG. 3 depicts an illustrative embodiment of a method 300 used in portions of the system described in FIGS. 1 and 2A-2B. In one or more embodiments, the method 300 can be implemented by an ad management server. The method 300 can include the ad management server, at 302, determining a media profile for media content. The media profile can comprise a media metric for each of a plurality of portions of the media content resulting in a plurality of media metrics. Further, the method 300 can include the ad management server, at 304, determining a price for advertising associated with the media content. In addition, the method 300 can include the ad management server, at 306, identifying an advertisement profile for each of a plurality of advertisements resulting in a plurality of advertisement profiles. The advertisement profile can comprise an ad metric for each of a plurality of portions of an advertisement resulting in a plurality of ad metrics. Also, the method 300 can the ad management server, at 308, include selecting an advertisement associated with an advertisement profile from the plurality of advertisements according to the media profile, the advertisement profile, and the price for the advertising associated with the media content. Further, the method 300 can include the ad management server, at 309, providing the advertisement to be presented with the media content at a playback device.

In one or more embodiments, the method 300 can include the ad management server, at 310, notifying a plurality of advertisers requesting a bid for the advertising. Further, the method 300 can include the ad management server, at 312, receiving the bid from each of the plurality of advertisers resulting in a plurality of bids. In some embodiments, selecting the advertisement comprises selecting the advertisement according to a first bid associated with the advertisement, wherein the first bid is highest among the plurality of bids.

In one or more embodiments, the method 300 can include the ad management server, at 314, identifying or determining an item presented in the media content. Further, the method 300 can include the ad management server, a 316, determining a correlation with the item. In some embodiments, a correlation the determined item in the media content itself or can a competing to the item determined within the media content. In addition, the method can include the ad management server, at 318, determining an advertisement for the item. In further embodiments, selecting of the advertisement can be based on the correlation to the item.

In one or more embodiments, the method 300 can include the ad management server, at 320, detecting a type of playback device for the advertisement. In some embodiments, selecting of the advertisement can comprise selecting the advertisement according to the type of playback device. In further embodiments, selecting the advertisement according to a type of playback device can be in response to detecting the type of playback device for the first advertisement. In additional embodiments, the method 300 can include the ad management server, at 322, detecting a type of playback medium for the media content. In some embodiments, selecting the advertisement comprises selecting the advertisement according to the type of playback medium for the media content.

In one or more embodiments, the method 300 can include the ad management server, at 324, determining historical viewership of previous advertisements associated with the media content or related media content. In some embodiments, the selecting of the advertisement comprises selecting the advertisement according to historical viewership of previous advertisements associated with the media content or related media content. In further embodiments, the method 300 can include the ad management server, at 326, determining historical viewership of the media content or related media content. In other embodiments, the selecting of the advertisement comprises selecting the advertisement according to historical viewership of the media content or related media content. In additional embodiments, the method 300 can include the ad management server, at 328, determining a level of interaction of previous advertisements associated with the media content or related media content. In some embodiments, selecting of the advertisement comprises selecting the first advertisement according to the level of interaction of the previous advertisements.

While for purposes of simplicity of explanation, the respective processes are shown and described as a series of blocks in FIG. 3, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein. Further, portions of or entire embodiments can be combined with portions of or entire other embodiments.

Figure 4:
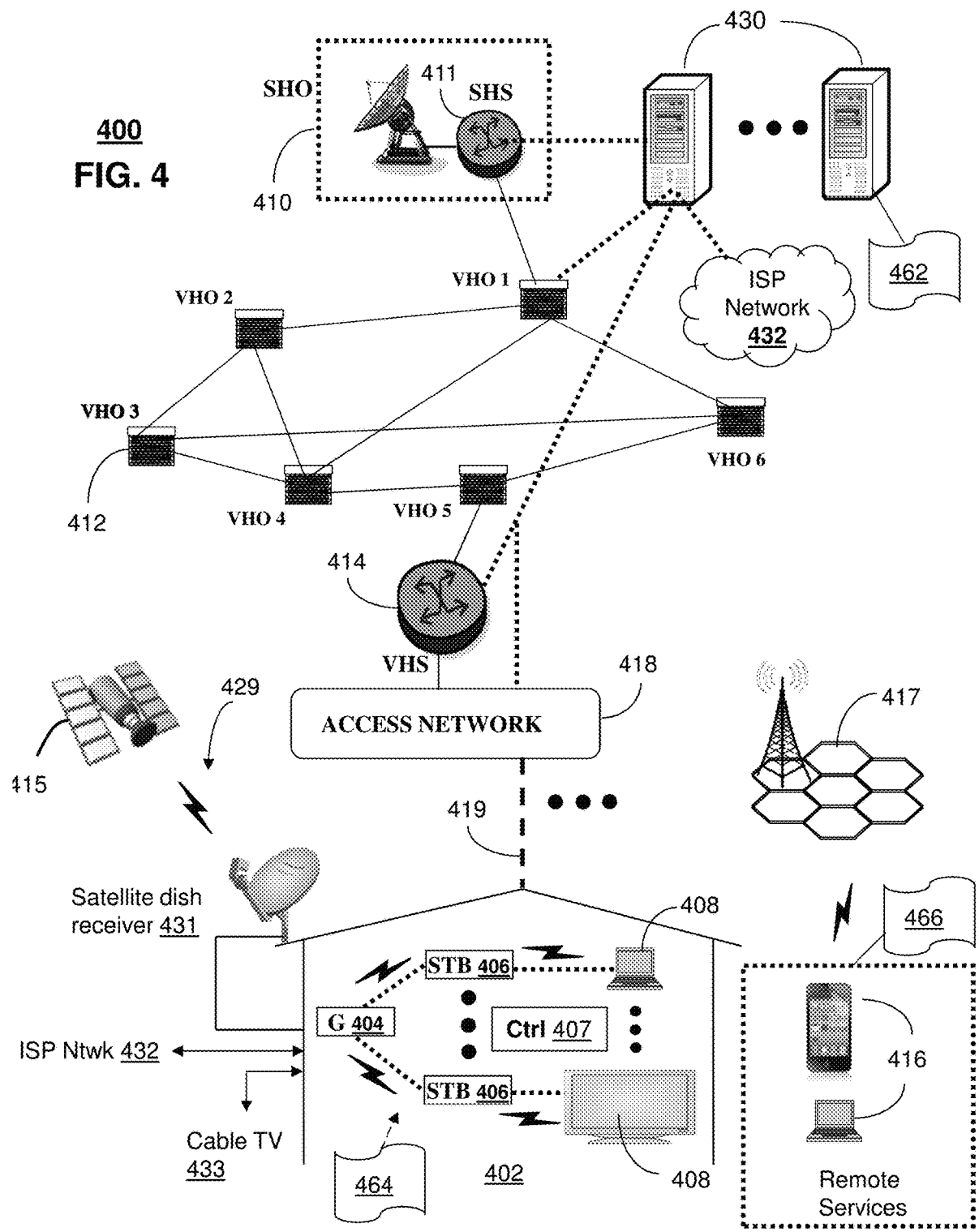
FIGS. 4-5 depict illustrative embodiments of communication systems that provide advertisement services for media content.

FIG. 4 depicts an illustrative embodiment of a communication system 400 for providing various communication services, such as delivering media content. The communication system 400 can represent an interactive media network, such as an interactive television system (e.g., an Internet Protocol Television (IPTV) media system). Communication system 400 can be overlaid or operably coupled with systems 100, 200, 250 of FIGS. 1 and/or 2A-2B as another representative embodiment of communication system 400. For instance, one or more devices illustrated in the communication system 400 of FIG. 4 can be ad management server 430. Embodiment can include determining a media profile for media content. The media profile comprises a media metric for each of a plurality of portions of the media content resulting in a plurality of media metrics. Further embodiments can include determining a price for advertising associated with the media content. Additional embodiments can include identifying an advertisement profile for each of a plurality of advertisements resulting in a plurality of advertisement profiles. The advertisement profile comprises an ad metric for each of a plurality of portions of an advertisement resulting in a plurality of ad metrics. Also, embodiments can include detecting a type of playback device for the advertising associated with the media content. Further embodiments can include selecting a first advertisement associated with a first advertisement profile from the plurality of advertisements according to the media profile, the first advertisement profile, the price for the advertising associated with the media content, and the type of playback device. Additional embodiments can include providing the first advertisement to be presented with the media content at the playback device.

In one or more embodiments, the communication system 400 can include a super head-end office (SHO) 410 with at least one super headend office server (SHS) 411 which receives media content from satellite and/or terrestrial communication systems. In the present context, media content can represent, for example, audio content, moving image content such as 2D or 3D videos, video games, virtual reality content, still image content, and combinations thereof. The SHS server 411 can forward packets associated with the media content to one or more video head-end servers (VHS) 414 via a network of video head-end offices (VHO) 412 according to a multicast communication protocol. The VHS 414 can distribute multimedia broadcast content via an access network 418 to commercial and/or residential buildings 402 housing a gateway 404 (such as a residential or commercial gateway).

The access network 418 can represent a group of digital subscriber line access multiplexers (DSLAMs) located in a central office or a service area interface that provide broadband services over fiber optical links or copper twisted pairs 419 to buildings 402. The gateway 404 can use communication technology to distribute broadcast signals to media processors 406 such as Set-Top Boxes (STBs) which in turn present broadcast channels to media devices 408 such as computers or television sets managed in some instances by a media controller 407 (such as an infrared or RF remote controller).

The gateway 404, the media processors 406, and media devices 408 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 406 and subsystems of the IPTV media system for services such as video-on-demand (VoD), browsing an electronic programming guide (EPG), or other infrastructure services.

A satellite broadcast television system 429 can be used in the media system of FIG. 4. The satellite broadcast television system can be overlaid, operably coupled with, or replace the IPTV system as another representative embodiment of communication system 400. In this embodiment, signals transmitted by a satellite 415 that include media content can be received by a satellite dish receiver 431 coupled to the building 402. Modulated signals received by the satellite dish receiver 431 can be transferred to the media processors 406 for demodulating, decoding, encoding, and/or distributing broadcast channels to the media devices 408. The media processors 406 can be equipped with a broadband port to an Internet Service Provider (ISP) network 432 to enable interactive services such as VoD and EPG as described above.

In yet another embodiment, an analog or digital cable broadcast distribution system such as cable TV system 433 can be overlaid, operably coupled with, or replace the IPTV system and/or the satellite TV system as another representative embodiment of communication system 400. In this embodiment, the cable TV system 433 can also provide Internet, telephony, and interactive media services. System 400 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 430, a portion of which can operate as a web server for providing web portal services over the ISP network 432 to wireline media devices 408 or wireless communication devices 416.

Communication system 400 can also provide for all or a portion of the computing devices 430 to function as ad management server (herein referred to as ad management server 430). The ad management server 430 can use computing and communication technology to perform function 462, which can include among other things, the techniques described by method 300 of FIG. 3. For instance, function 462 of ad management server 430 can be similar to the functions described for ad management server 114 of FIG. 1 in accordance with method 300 of FIG. 3. The media processors 406 and wireless communication devices 416 can be provisioned with software functions 464 and 466, respectively, to utilize the services of ad management server 430. For instance, functions 464 and 466 of media processors 406 and wireless communication devices 416 can be similar to the functions described for the communication devices 116-122 of FIG. 1 in accordance with method 300 of FIG. 3.

Multiple forms of media services can be offered to media devices over landline technologies such as those described above. Additionally, media services can be offered to media devices by way of a wireless access base station 417 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 5:
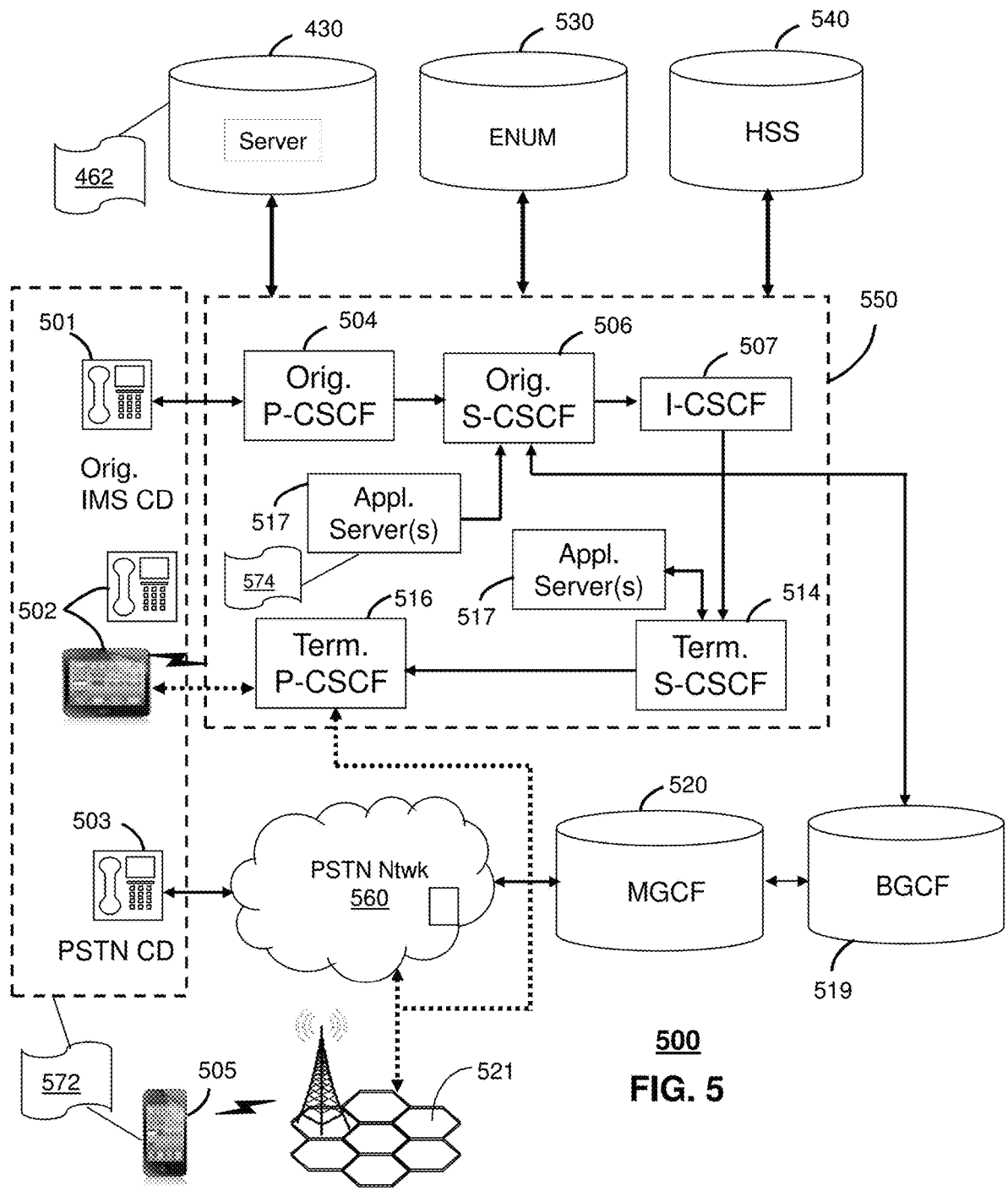

FIG. 5 depicts an illustrative embodiment of a communication system 500 employing an IP Multimedia Subsystem (IMS) network architecture to facilitate the combined services of circuit-switched and packet-switched systems. Communication system 500 can be overlaid or operably coupled with system 100, 200, 250 of FIGS. 1 and/or 2 and communication system 400 as another representative embodiment of communication system 400.

Embodiments can include determining a media profile for media content. The media profile comprises a media metric for each of a plurality of portions of the media content resulting in a plurality of media metrics. Further embodiments can include determining a price for advertising associated with the media content. Additional embodiments can include identifying an advertisement profile for each of a plurality of advertisements resulting in a plurality of advertisement profiles. The advertisement profile comprises an ad metric for each of a plurality of portions of an advertisement resulting in a plurality of ad metrics. Also, the embodiments can include selecting a first advertisement associated with a first advertisement profile from the plurality of advertisements according to the media profile, the first advertisement profile, and the price for the advertising associated with the media content. Further embodiments can include providing the first advertisement to be presented with the media content at a playback device.

Communication system 500 can comprise a Home Subscriber Server (HSS) 540, a tElephone NUmber Mapping (ENUM) server 530, and other network elements of an IMS network 550. The IMS network 550 can establish communications between IMS-compliant communication devices (CDs) 501, 502, Public Switched Telephone Network (PSTN) CDs 503, 505, and combinations thereof by way of a Media Gateway Control Function (MGCF) 520 coupled to a PSTN network 560. The MGCF 520 need not be used when a communication session involves IMS CD to IMS CD communications. A communication session involving at least one PSTN CD may utilize the MGCF 520.

IMS CDs 501, 502 can register with the IMS network 550 by contacting a Proxy Call Session Control Function (P-CSCF) which communicates with an interrogating CSCF (I-CSCF), which in turn, communicates with a Serving CSCF (S-CSCF) to register the CDs with the HSS 540. To initiate a communication session between CDs, an originating IMS CD 501 can submit a Session Initiation Protocol (SIP INVITE) message to an originating P-CSCF 504 which communicates with a corresponding originating S-CSCF 506. The originating S-CSCF 506 can submit the SIP INVITE message to one or more application servers (ASs) 517 that can provide a variety of services to IMS subscribers.

For example, the application servers 517 can be used to perform originating call feature treatment functions on the calling party number received by the originating S-CSCF 506 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 506 can submit queries to the ENUM system 530 to translate an E.164 telephone number in the SIP INVITE message to a SIP Uniform Resource Identifier (URI) if the terminating communication device is IMS-compliant. The SIP URI can be used by an Interrogating CSCF (I-CSCF) 507 to submit a query to the HSS 540 to identify a terminating S-CSCF 514 associated with a terminating IMS CD such as reference 502. Once identified, the I-CSCF 507 can submit the SIP INVITE message to the terminating S-CSCF 514. The terminating S-CSCF 514 can then identify a terminating P-CSCF 516 associated with the terminating CD 502. The P-CSCF 516 may then signal the CD 502 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 5 may be interchangeable. It is further noted that communication system 500 can be adapted to support video conferencing. In addition, communication system 500 can be adapted to provide the IMS CDs 501, 502 with the multimedia and Internet services of communication system 400 of FIG. 4.

If the terminating communication device is instead a PSTN CD such as CD 503 or CD 505 (in instances where the cellular phone only supports circuit-switched voice communications), the ENUM system 530 can respond with an unsuccessful address resolution which can cause the originating S-CSCF 506 to forward the call to the MGCF 520 via a Breakout Gateway Control Function (BGCF) 519. The MGCF 520 can then initiate the call to the terminating PSTN CD over the PSTN network 560 to enable the calling and called parties to engage in voice and/or data communications.

It is further appreciated that the CDs of FIG. 5 can operate as wireline or wireless devices. For example, the CDs of FIG. 5 can be communicatively coupled to a cellular base station 521, a femtocell, a WiFi router, a Digital Enhanced Cordless Telecommunications (DECT) base unit, or another suitable wireless access unit to establish communications with the IMS network 550 of FIG. 5. The cellular access base station 521 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 5.

Cellular phones supporting LTE can support packet-switched voice and packet-switched data communications and thus may operate as IMS-compliant mobile devices. In this embodiment, the cellular base station 521 may communicate directly with the IMS network 550 as shown by the arrow connecting the cellular base station 521 and the P-CSCF 516.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The ad management server 430 of FIG. 4 can be operably coupled to communication system 500 for purposes similar to those described above. Ad management server 430 can perform function 462 and thereby provide advertisement management services to the CDs 501, 502, 503 and 505 of FIG. 5 similar to the functions described for ad management server 114 of FIG. 1 in accordance with method 300 of FIG. 3. CDs 501, 502, 503 and 505, which can be adapted with software to perform function 572 to utilize the services of the ad management server 430 similar to the functions described for communication devices 116-122 of FIG. 1 in accordance with method 300 of FIG. 3. Ad management server 430 can be an integral part of the application server(s) 517 performing function 574, which can be substantially similar to function 462 and adapted to the operations of the IMS network 550.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 6:
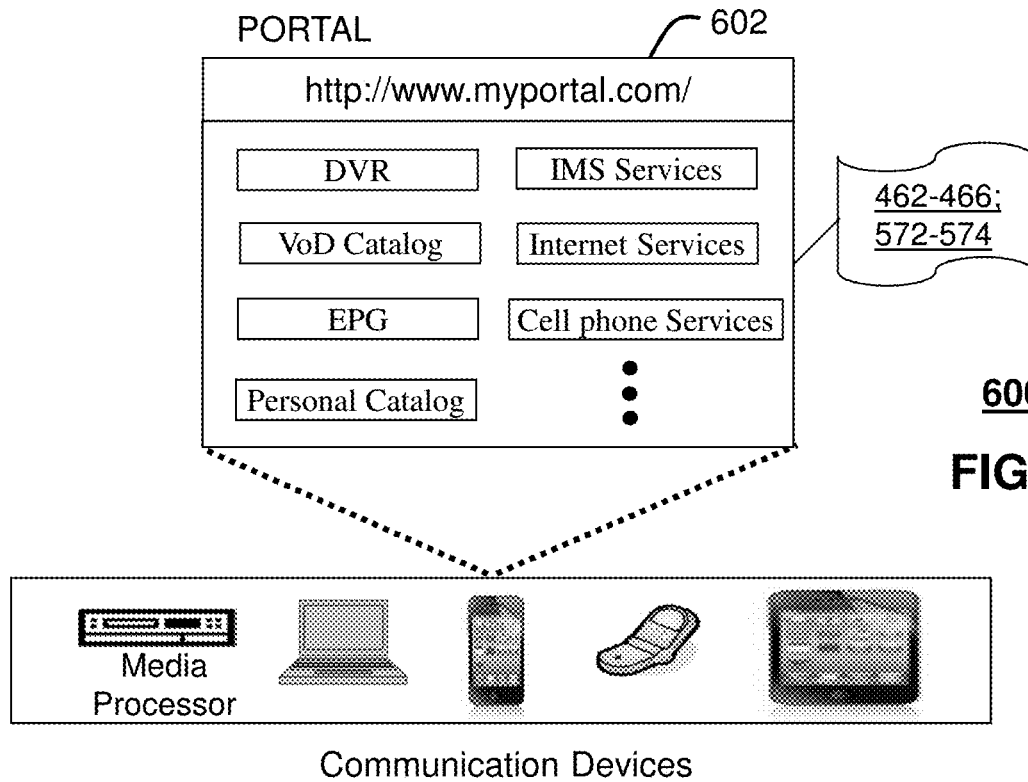
FIG. 6 depicts an illustrative embodiment of a web portal for interacting with the communication systems for advertisement management services for media content.

FIG. 6 depicts an illustrative embodiment of a web portal 602 of a communication system 600. Communication system 600 can be overlaid or operably coupled with systems 100, 200, 250 of FIGS. 1 and/or 2, communication system 400, and/or communication system 500 as another representative embodiment of systems 100, 200, 250 of FIGS. 1 and/or 2A-2B, communication system 400, and/or communication system 500. The web portal 602 can be used for managing services of systems 100, 200, 250 of FIGS. 1 and/or 2A-2B and communication systems 400-500. A web page of the web portal 602 can be accessed by a Uniform Resource Locator (URL) with an Internet browser using an Internet-capable communication device such as those described in FIGS. 1 and/or 2A-2B and FIGS. 4-5. The web portal 602 can be configured, for example, to access a media processor 406 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 406. The web portal 602 can also be used for provisioning IMS services described earlier, provisioning Internet services, provisioning cellular phone services, and so on.

The web portal 602 can further be utilized to manage and provision software applications 462-466, and 572-574 to adapt these applications as may be desired by subscribers and/or service providers of systems 100, 200, 250 of FIGS. 1 and/or 2A-2B, and communication systems 400-500. For instance, users of the services provided by server 114 or server 430 can log into their on-line accounts and provision the servers 110 or server 430 with training data such that can utilize machine learning to select advertisements for media content as described herein. Service providers can log onto an administrator account to provision, monitor and/or maintain the systems 100, 200, 250 of FIGS. 1 and/or 2A-2B or server 430.

Figure 7:
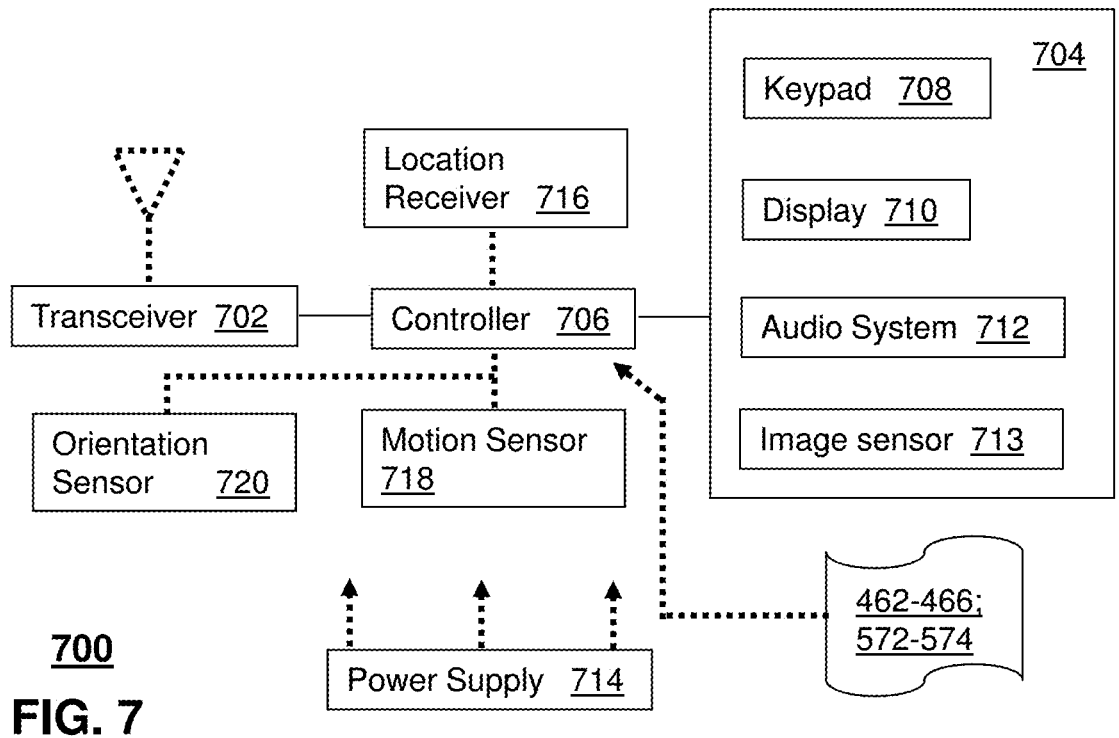
FIG. 7 depicts an illustrative embodiment of a communication device.

FIG. 7 depicts an illustrative embodiment of a communication device 700. Communication device 700 can serve in whole or in part as an illustrative embodiment of the devices depicted in FIGS. 1 and/or 2A-2B, and FIGS. 4-5 and can be configured to perform portions of method 300 of FIG. 3.

Communication device 700 can comprise a wireline and/or wireless transceiver 702 (herein transceiver 702), a user interface (UI) 704, a power supply 714, a location receiver 716, a motion sensor 718, an orientation sensor 720, and a controller 706 for managing operations thereof. The transceiver 702 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 702 can also be adapted to support circuit-switched wireline access technologies (such as PSTN), packet-switched wireline access technologies (such as TCP/IP, VoIP, etc.), and combinations thereof.

The UI 704 can include a depressible or touch-sensitive keypad 708 with a navigation mechanism such as a roller ball, a joystick, a mouse, or a navigation disk for manipulating operations of the communication device 700. The keypad 708 can be an integral part of a housing assembly of the communication device 700 or an independent device operably coupled thereto by a tethered wireline interface (such as a USB cable) or a wireless interface supporting for example Bluetooth®. The keypad 708 can represent a numeric keypad commonly used by phones, and/or a QWERTY keypad with alphanumeric keys. The UI 704 can further include a display 710 such as monochrome or color LCD (Liquid Crystal Display), OLED (Organic Light Emitting Diode) or other suitable display technology for conveying images to an end user of the communication device 700. In an embodiment where the display 710 is touch-sensitive, a portion or all of the keypad 708 can be presented by way of the display 710 with navigation features.

The display 710 can use touch screen technology to also serve as a user interface for detecting user input. As a touch screen display, the communication device 700 can be adapted to present a user interface with graphical user interface (GUI) elements that can be selected by a user with a touch of a finger. The touch screen display 710 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 710 can be an integral part of the housing assembly of the communication device 700 or an independent device communicatively coupled thereto by a tethered wireline interface (such as a cable) or a wireless interface.

The UI 704 can also include an audio system 712 that utilizes audio technology for conveying low volume audio (such as audio heard in proximity of a human ear) and high volume audio (such as speakerphone for hands free operation). The audio system 712 can further include a microphone for receiving audible signals of an end user. The audio system 712 can also be used for voice recognition applications. The UI 704 can further include an image sensor 713 such as a charged coupled device (CCD) camera for capturing still or moving images.

The power supply 714 can utilize common power management technologies such as replaceable and rechargeable batteries, supply regulation technologies, and/or charging system technologies for supplying energy to the components of the communication device 700 to facilitate long-range or short-range portable applications. Alternatively, or in combination, the charging system can utilize external power sources such as DC power supplied over a physical interface such as a USB port or other suitable tethering technologies.

The location receiver 716 can utilize location technology such as a global positioning system (GPS) receiver capable of assisted GPS for identifying a location of the communication device 700 based on signals generated by a constellation of GPS satellites, which can be used for facilitating location services such as navigation. The motion sensor 718 can utilize motion sensing technology such as an accelerometer, a gyroscope, or other suitable motion sensing technology to detect motion of the communication device 700 in three-dimensional space. The orientation sensor 720 can utilize orientation sensing technology such as a magnetometer to detect the orientation of the communication device 700 (north, south, west, and east, as well as combined orientations in degrees, minutes, or other suitable orientation metrics).

The communication device 700 can use the transceiver 702 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 706 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 700.

Other components not shown in FIG. 7 can be used in one or more embodiments of the subject disclosure. For instance, the communication device 700 can include a reset button (not shown). The reset button can be used to reset the controller 706 of the communication device 700. In yet another embodiment, the communication device 700 can also include a factory default setting button positioned, for example, below a small hole in a housing assembly of the communication device 700 to force the communication device 700 to re-establish factory settings. In this embodiment, a user can use a protruding object such as a pen or paper clip tip to reach into the hole and depress the default setting button. The communication device 700 can also include a slot for adding or removing an identity module such as a Subscriber Identity Module (SIM) card. SIM cards can be used for identifying subscriber services, executing programs, storing subscriber data, and so forth.

The communication device 700 as described herein can operate with more or less of the circuit components shown in FIG. 7. These variant embodiments can be used in one or more embodiments of the subject disclosure.

The communication device 700 can be adapted to perform the functions of devices of FIGS. 1 and/or 2A-2B, the media processor 406, the media devices 408, or the portable communication devices 416 of FIG. 4, as well as the IMS CDs 501-502 and PSTN CDs 503-505 of FIG. 5. It will be appreciated that the communication device 700 can also represent other devices that can operate in systems of FIGS. 1 and/or 2A-2B, communication systems 400-500 of FIGS. 4-5 such as a gaming console and a media player. In addition, the controller 706 can be adapted in various embodiments to perform the functions 462-466 and 572-574, respectively.

Upon reviewing the aforementioned embodiments, it would be evident to an artisan with ordinary skill in the art that said embodiments can be modified, reduced, or enhanced without departing from the scope of the claims described below. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 8:
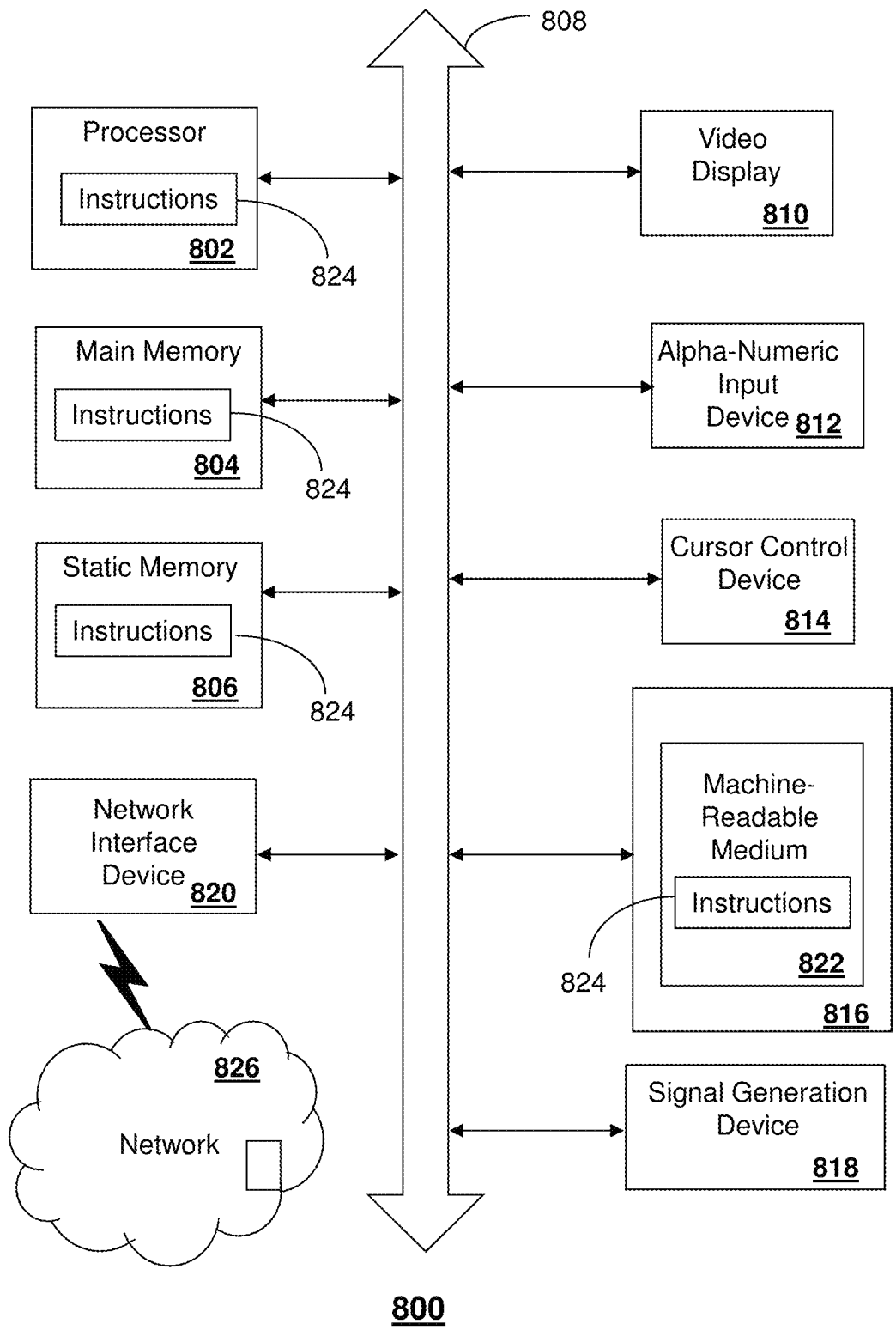
FIG. 8 is a diagrammatic representation of a machine in the form of a computer system within which a set of instructions, when executed, may cause the machine to perform any one or more of the methods described herein.

FIG. 8 depicts an exemplary diagrammatic representation of a machine in the form of a computer system 800 within which a set of instructions, when executed, may cause the machine to perform any one or more of the methods described above. One or more instances of the machine can operate, for example, as the ad management server 430, the media processor 406, databases 102-106, servers 108-114, and playback devices 116-122 and other devices of FIGS. 1-7. In some embodiments, the machine may be connected (e.g., using a network 826) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 800 may include a processor (or controller) 802 (e.g., a central processing unit (CPU)), a graphics processing unit (GPU, or both), a main memory 804 and a static memory 806, which communicate with each other via a bus 808. The computer system 800 may further include a display unit 810 (e.g., a liquid crystal display (LCD), a flat panel, or a solid state display). The computer system 800 may include an input device 812 (e.g., a keyboard), a cursor control device 814 (e.g., a mouse), a disk drive unit 816, a signal generation device 818 (e.g., a speaker or remote control) and a network interface device 820. In distributed environments, the embodiments described in the subject disclosure can be adapted to utilize multiple display units 810 controlled by two or more computer systems 800. In this configuration, presentations described by the subject disclosure may in part be shown in a first of the display units 810, while the remaining portion is presented in a second of the display units 810.

The disk drive unit 816 may include a tangible computer-readable storage medium 822 on which is stored one or more sets of instructions (e.g., software 824) embodying any one or more of the methods or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 822 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 800. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device, comprising:
   a processing system including a processor; and
   a memory that stores executable instructions that, when executed by the processing system, facilitate performance of operations, the operations comprising:
   determining a media profile for media content, wherein the media profile comprises a media metric for each of a plurality of portions of the media content resulting in a plurality of media metrics;
   determining a price for advertising associated with the media content;
   identifying a first playback device and identifying a second playback device;
   determining a first playback medium associated with the first playback device and determining a second playback medium associated with the second playback device, wherein the first playback medium comprises a broadcast playback medium, wherein the second playback medium comprises a streaming playback medium;

identifying a first group of advertisements according to the first playback device;

identifying a second group of advertisements according to the second playback device;

identifying a third group of advertisements according to the broadcast playback medium;

identifying a fourth group of advertisements according to the streaming playback medium;

identifying an advertisement profile for each of a plurality of advertisements resulting in a plurality of advertisement profiles, wherein the advertisement profile comprises an ad metric for each of a plurality of portions of an advertisement resulting in a plurality of ad metrics;

identifying a first item within visual content of the media content using image recognition resulting in a visual identification;

identifying a second item within audio content of the media content using voice recognition resulting in an audio identification;

selecting a first advertisement associated with the first item, the second item, and a first advertisement profile from the plurality of advertisements according to the visual identification, audio identification, media profile, the first advertisement profile, the price for the advertising associated with the media content, the first playback device, the second playback device, the first playback medium, and the second playback medium, wherein each of the first group of advertisements, the second group of advertisements, the third group of advertisements, and the fourth group of advertisements includes the first advertisement; and multicasting, over a communication network, the first advertisement to be presented with the media content at the first playback device and at the second playback device, wherein the multicasting comprises providing the first advertisement and the media content within broadcast playback medium for the first playback device and providing the first advertisement and the media content within the streaming playback medium, wherein the first playback device presents the first advertisement proximate to the media content during broadcast playback, wherein the second playback device presents the first advertisement embedded within the media content during streaming playback.

2. The device of claim 1, wherein the determining of the price for advertising associated with the media content comprises notifying a plurality of advertisers requesting a bid for the advertising.

3. The device of claim 2, wherein the determining of the price for advertising associated with the media content comprises receiving the bid from each of the plurality of advertisers resulting in a plurality of bids.

4. The device of claim 3, wherein the selecting of the first advertisement comprises selecting the first advertisement according to a first bid associated with the first advertisement, wherein the first bid is highest among the plurality of bids.

5. The device of claim 1, wherein the selecting of the first advertisement is based on a correlation to the first item and the second item.

6. The device of claim 5, wherein the correlation is a competing item to the item presented in the media content.

7. The device of claim 1, wherein the selecting of the first advertisement comprises selecting the first advertisement according to a type of playback device in response to detecting the type of playback device for the first advertisement.

8. The device of claim 1, wherein the selecting of the first advertisement comprises selecting the first advertisement according to historical viewership of previous advertisements associated with the media content.

9. The device of claim 1, wherein the identifying of the first group of advertisements comprises identifying the first group of advertisements in response to detecting one of capability of the first playback device, and resolution of the first playback device, wherein the identifying of the second group of advertisements comprises identifying the second group of advertisements in response to detecting one of capability of the second playback device, and resolution of the second playback device, wherein the identifying the third group of advertisements comprises identifying the third group of advertisements in response to detecting an advertisement space associated with the broadcast playback medium, wherein the identifying the fourth group of advertisements comprises identifying the fourth group of advertisements in response to detecting an advertisement space associated with the streaming playback medium.

10. The device of claim 1, wherein the operations comprise determining a level of interaction of previous advertisements associated with the media content.

11. The device of claim 10, wherein the selecting of the first advertisement comprises selecting the first advertisement according to the level of interaction of the previous advertisements.

12. A non-transitory, machine-readable medium, comprising executable instructions that, when executed by a processing system including a processor, facilitate performance of operations, the operations comprising:

determining a media profile for media content, wherein the media profile comprises a media metric for each of a plurality of portions of the media content resulting in a plurality of media metrics;

determining a price for advertising associated with the media content;

identifying a first playback device and identifying a second playback device;

determining a first playback medium associated with the first playback device and determining a second playback medium associated with the second playback device, wherein the first playback medium comprises a broadcast playback medium, wherein the second playback medium comprises a streaming playback medium;

identifying a first group of advertisements according to the first playback device;

identifying a second group of advertisements according to the second playback device;

identifying a third group of advertisements according to the broadcast playback medium;

identifying a fourth group of advertisements according to the streaming playback medium;

identifying an advertisement profile for each of a plurality of advertisements resulting in a plurality of advertisement profiles, wherein the advertisement profile comprises an ad metric for each of a plurality of portions of an advertisement resulting in a plurality of ad metrics;

identifying a first item within visual content of the media content using image recognition resulting in a visual identification;

identifying a second item within audio content of the media content using voice recognition resulting in an audio identification;

selecting a first advertisement associated with the first item, the second item, and a first advertisement profile from the plurality of advertisements according to the visual identification, audio identification, media profile, the first advertisement profile, the price for the advertising associated with the media content, and the first playback device, the second playback device, the first playback medium, and the second playback medium, wherein each of the first group of advertisements, the second group of advertisements, the third group of advertisements, and the fourth group of advertisements includes the first advertisement; and multicasting, over a communication network, the first advertisement to be presented with the media content at the first playback device and at the second playback device, wherein the multicasting comprises providing the first advertisement and the media content within broadcast playback medium for the first playback device and providing the first advertisement and the media content within the streaming playback medium, wherein the first playback device presents the first advertisement proximate to the media content during broadcast playback, wherein the second playback device presents the first advertisement embedded within the media content during streaming playback.

13. The non-transitory, machine-readable medium of claim 12, wherein the determining of the price for the advertising associated with the media content comprises:

notifying a plurality of advertisers requesting a bid for the advertising; and receiving the bid from each of the plurality of advertisers resulting in a plurality of bids, wherein the selecting the first advertisement comprises selecting the first advertisement according to a first bid associated with the first advertisement, and wherein the first bid is highest among the plurality of bids.

14. The non-transitory, machine-readable medium of claim 12, wherein the selecting the first advertisement is based on a correlation to the first item and the second item.

15. The non-transitory, machine-readable medium of claim 12, wherein the selecting of the first advertisement comprises selecting the first advertisement according to historical viewership of previous advertisements associated with the media content.

16. The non-transitory, machine-readable medium of claim 12, wherein the operations comprise determining a level of interaction of previous advertisements associated with the media content, wherein the selecting of the first advertisement comprises selecting the first advertisement according to the level of interaction of the previous advertisements.

17. A method, comprising:

determining, by a processing system including a processor, a media profile for media content, wherein the media profile comprises a media metric for each of a plurality of portions of the media content resulting in a plurality of media metrics;

determining, by the processing system, a price for advertising associated with the media content;

identifying, by the processing system, a first playback device and identifying a second playback device;

determining, by the processing system, a first playback medium associated with the first playback device and determining, by the processing system, a second playback medium associated with the second playback device, wherein the first playback medium comprises a broadcast playback medium, wherein the second playback medium comprises a streaming playback medium;

identifying, by the processing system, a first group of advertisements according to the first playback device;

identifying, by the processing system, a second group of advertisements according to the second playback device;

identifying, by the processing system, a third group of advertisements according to the broadcast playback medium;

identifying, by the processing system, a fourth group of advertisements according to the streaming playback medium;

identifying, by the processing system, an advertisement profile for each of a plurality of advertisements resulting in a plurality of advertisement profiles, wherein the advertisement profile comprises an ad metric for each of a plurality of portions of an advertisement resulting in a plurality of ad metrics;

identifying, by the processing system, a first item within visual content of the media content using image recognition resulting in a visual identification;

identifying, by the processing system, a second item within audio content of the media content using voice recognition resulting in an audio identification;

selecting, by the processing system, a first advertisement associated with the first item, the second item, and a first advertisement profile from the plurality of advertisements according to the visual identification, audio identification, media profile, the first advertisement profile, the price for the advertising associated with the media content, and the first playback device, the second playback device, the first playback medium, and the second playback medium, wherein each of the first group of advertisements, the second group of advertisements, the third group of advertisements, and the fourth group of advertisements includes the first advertisement; and multicasting, by the processing system, over a communication network, the first advertisement to be presented with the media content at the first playback device and at the second playback device, wherein the multicasting comprises providing, by the processing system, the first advertisement and the media content within broadcast playback medium for the first playback device and providing, by the processing system, the first advertisement and the media content within the streaming playback medium, wherein the first playback device presents the first advertisement proximate to the media content during broadcast playback, wherein the second playback device presents the first advertisement embedded within the media content during streaming playback.

18. The method of claim 17, wherein the determining of the price for the advertising associated with the media content comprises:

notifying, by the processing system, a plurality of advertisers requesting a bid for the advertising; and receiving, by the processing system, the bid from each of the plurality of advertisers resulting in a plurality of bids, wherein the selecting the first advertisement comprises selecting, by the processing system, the first advertisement according to a first bid associated with the first advertisement, and wherein the first bid is highest among the plurality of bids.

19. The method of claim 17, wherein the selecting the first advertisement is based on a correlation to the first item and the second item.

20. The method of claim 17, wherein the selecting of the first advertisement comprises selecting, by the processing system, the first advertisement according to historical viewership of the media content.

* * * * *